UNITED STATES PATENT OFFICE.

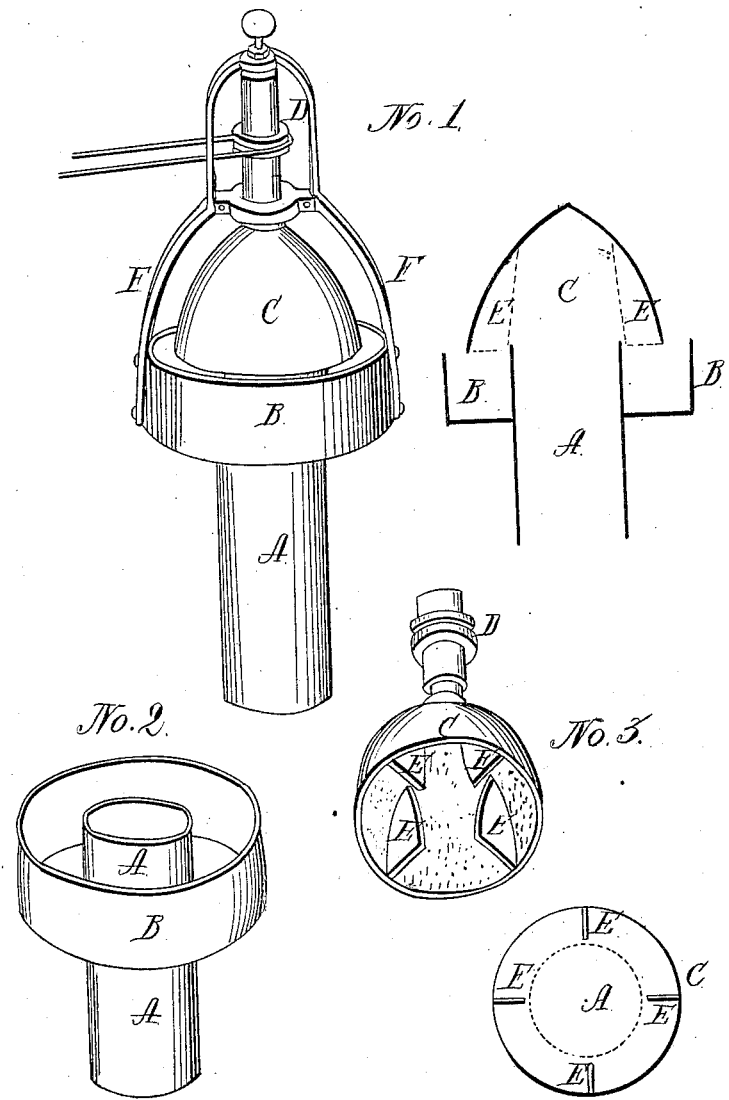

SAMUEL LEONARD, JR., OF BRIDGEWATER, MASSACHUSETTS.

EXTINGUISHING THE SPARKS FROM THE FUNNELS OF LOCOMOTIVE AND OTHER STEAM-ENGINES.

Specification of Letters Patent No. 1,038, dated December 15, 1838.

*To all whom it may concern:*

Be it known that I, SAMUEL LEONARD, Jr., of Bridgewater, in the county of Plymouth and State of Massachusetts, have invented a new and useful Machine to Extinguish the Sparks Proceeding from the Funnels of Locomotives and Steamboats and to Increase the Draft.

I do hereby declare that the following is a full and exact description.

The nature of my invention consists in providing at the top of the funnels of locomotives and steamboats a revolving cone or bell having wings or fans attached to the inside of the cone or bell, projecting inward nearly to the funnel, leaving the diameter of the funnel at the center of the cone or bell without wings or fans. The size of the cone or bell at the large end should exceed double the area of the funnel. This cone or bell answers a twofold purpose—that of reversing the current of the sparks to the water and of increasing the draft by the suction it produces in revolving. At the small end of the cone or bell a shaft is attached firmly to the cone or bell, and the shaft is hung perpendicularly in a frame attached to the vessel or funnel sufficiently strong to support the cone or bell. The cone or bell is turned by a drum propelled by the engine, with a belt from the drum to the whirl on the cone or bell shaft or by bevel gear wheels on a shaft, one on the cone or bell shaft corresponding. The cone or bell may be propelled with a velocity sufficient to create any degree of draft that is required. Therefore there should be a separate funnel to conduct off the exhaust steam. Around the funnel under the cone or bell is formed a vessel of sufficient diameter to receive the large end of the cone or bell and for the smoke to escape. The vessel should be of sufficient depth to contain water enough to extinguish the sparks or it may extend the whole length of the funnel, answering a double purpose of extinguishing the sparks and heating the water to supply the engine. In that case there should be a strainer in the vessel containing the water to separate the sparks from the water and other apparatus well known to machinists to replenish both the vessel and the boiler.

Figure 1 in the accompanying drawing is a perspective view of the machine. Fig. 2 represents the funnel and the attached vessel to contain the water. Fig. 3 represents the cone or bell with the wings or fans attached to the inside.

A A is the funnel.

B B is the vessel to contain the water and receive the sparks. On the underside of the vessel there may be an aperture and valve to close the same. The object of this aperture and valve is to clean out the vessel both of sparks and water when required.

C C is the cone or bell.

D D is the whirl or gear wheel on the cone or bell shaft.

E E is the wings or fans attached to the cone or bell. There may be more or a less number of wings or fans than is represented in the drawing.

F F is the frame in which the cone or bell is hung.

What I claim as my invention and desire to secure by Letters Patent is—

A cylindrical cone or bell with wings or fans revolving over the top of the funnels of locomotives and steamboats and other funnels to cause a sufficient draft and extinguish the sparks proceeding from them, by throwing them into water, and also a vessel surrounding the funnel to contain water to extinguish the sparks and to heat the water by which the engine may be supplied in a manner substantially the same with that herein fully set forth.

SAML. LEONARD, JR.

Witnesses:
SPENCER LEONARD, Jr.,
ARTEMAS HALE.